Figure 1:
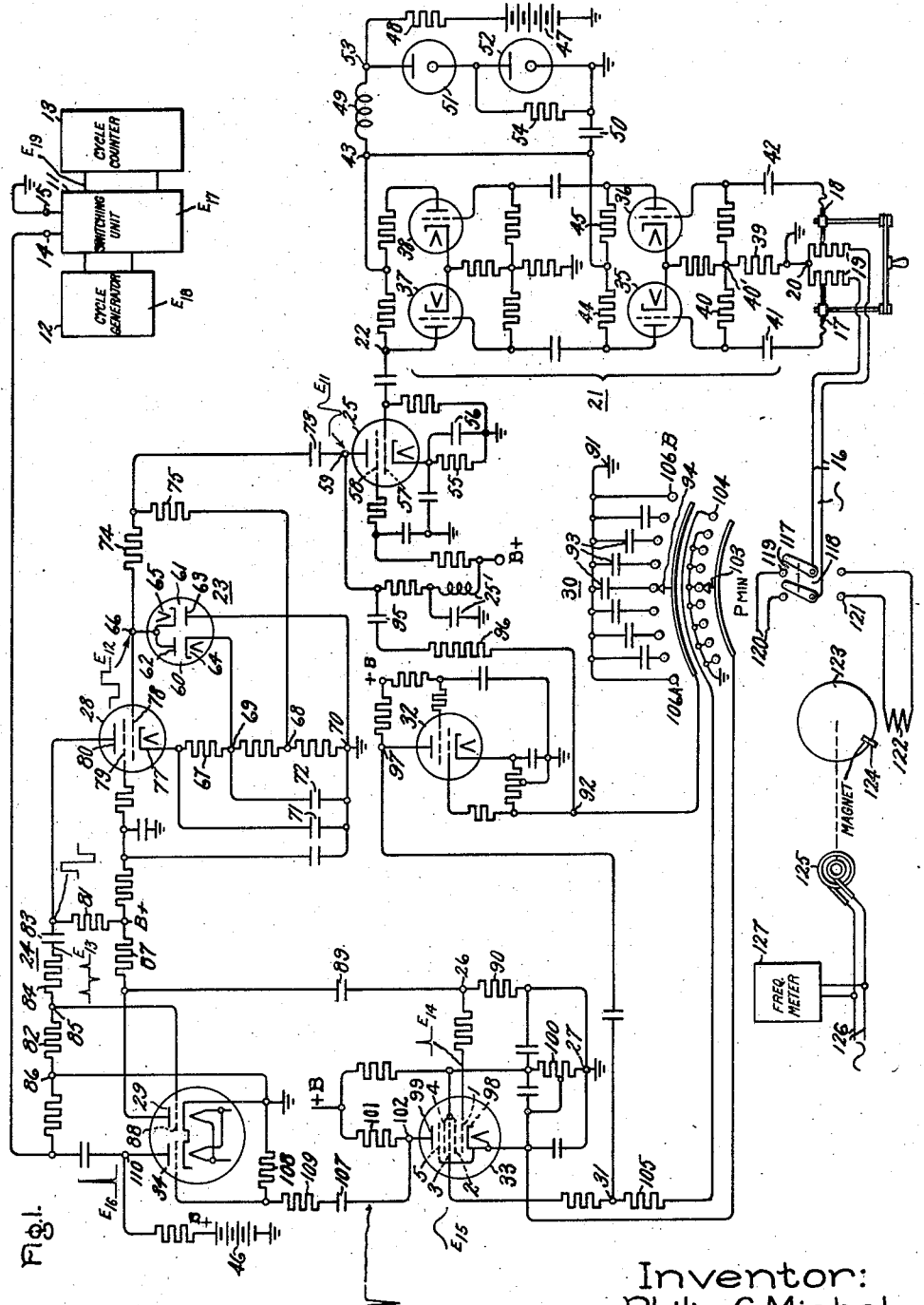

Inventor:
Philip C. Michel,
by Harry E. Dunham
His Attorney.

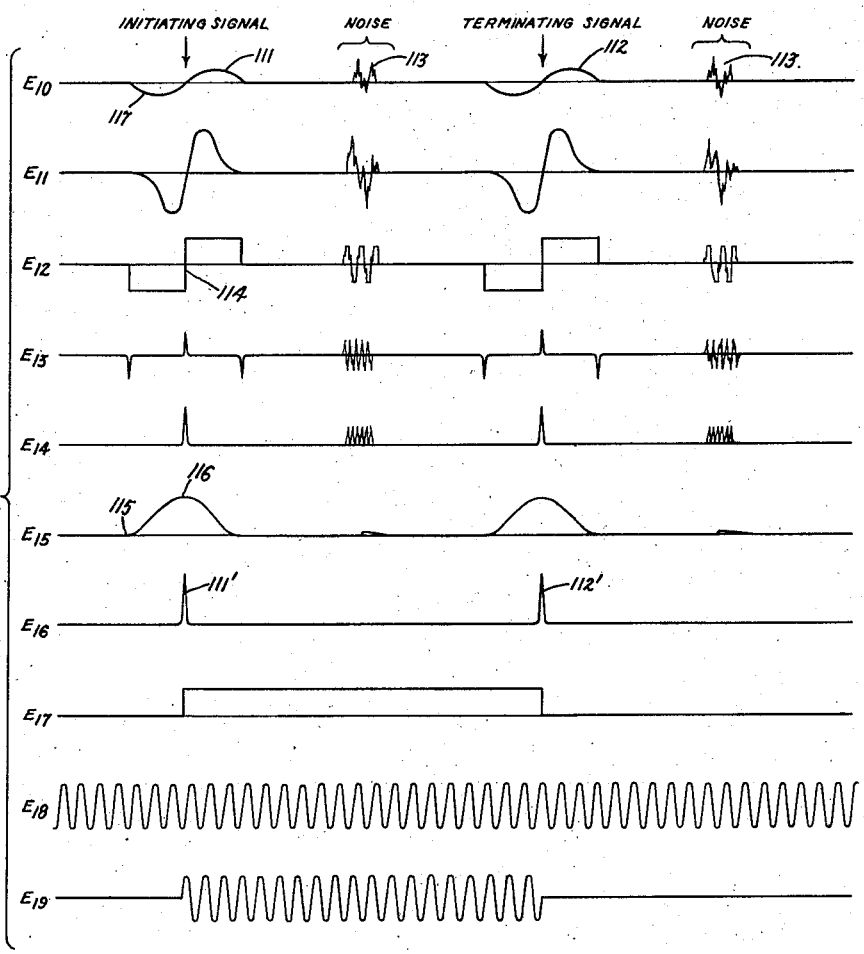

Patented Sept. 10, 1946

2,407,505

UNITED STATES PATENT OFFICE 2,407,505

ELECTRIC DISCHARGE DEVICE CIRCUIT

Philip C. Michel, Schenectady, N. Y., assignor to General Electric Company, a corporation of New York Application April 4, 1942, Serial No. 437,627

9 Claims. (Cl. 250—27)

The present application is a continuation-in-part of my copending application, Serial No. 419,035, filed November 13, 1941, Patent No. 2,324,314, dated July 13, 1943, and assigned to the same assignee as the present application.

My present invention relates to circuits employing electric discharge devices or electric valves and concerns particularly arrangements for use in impulse counting and interval timing.

It is an object of my invention to provide improved arrangements for transmitting impulse signals to impulse responsive devices with increased precision with regard to the instant of actuation of the impulse responsive device and with high accuracy and reliability with regard to the rejection of spurious signals.

Another object of my invention is to provide impulse transmitting arrangements which may readily be adjusted for various degrees of spurious signal rejection, and which are provided with arrangements for testing the impulse transmitting circuits together with the impulse responsive devices, counters or interval timers associated therewith.

Other and further objects and advantages will become apparent as the following description proceeds.

The apparatus to which the present application relates may be used, and is particularly useful, in conjunction with "on" and "off" control impulse-producing devices employed to measure time intervals. Relatively short time intervals may be measured accurately by counting the number of cycles of a source of high constant frequency impulses which are produced during the time interval between two control impulses. A switching unit is interposed between the high frequency cycle generator and a cycle counter and the switching unit is designed to turn "on" and "off" in response to the two successive control impulses. The apparatus to which the present application relates is particularly useful for increasing the accuracy with which control impulses are applied to such a switching unit. However, my invention is not limited to this particular application nor to the particular apparatus shown and described.

The control impulses ordinarily take the form of single cycles of voltage fluctuations such as might be produced by a magnet passing a current-producing coil or a device making and breaking an inductive circuit in proximity to such a coil. In order to produce high precision of operation of the switching unit, it is desirable that the switching unit be actuated at the precise instant that control voltage-fluctuation impulses pass through zero value or "cross the zero line." It is also desirable to prevent the switching unit from being actuated in response to spurious fluctuations which may be produced by stray inductive effects in conductors carrying the genuine control impulses. Such spurious voltage fluctuations are frequently referred to as noise.

In carrying out my invention in its preferred form I provide a pair of input terminals to which a pair of insulated conductors may be connected or coupled. These conductors carry the control impulses from the source at which they are generated. Since it may be necessary that these conductors be of appreciable length, they have a tendency to pick up voltage with respect to ground. For eliminating such line to ground voltages or noises, I interpose a signal amplifier and line to ground attenuator between the input terminals and a second pair of terminals referred to as intermediate terminals. Between these intermediate terminals and the final output terminals two different circuits are provided, one including a voltage differentiator and the other including a voltage integrator. The final output terminals here referred to are connected to the control terminals of the switching unit. These two circuits actually terminate in the control electrodes of a current-controlling device having two different control electrodes each of which must be maintained at a potential exceeding a predetermined value in order for the current-controlling device to pass current. The current-controlling device is operatively interposed in the circuit to the output terminals.

The first circuit between the said intermediate terminals and the current-controlling device also includes a clipper for converting the single-cycle input impulses into a square topped wave in addition to the differentiator which is for converting the square topped wave into a single sharp peak that occurs precisely at the instant of zero cross-over of the original wave. This sharp peak or differentiated wave occurs between a pair of differentiated wave terminals which are connected to one of the electrodes of the current-controlling device.

The second circuit between the said intermediate terminals and the current-controlling device includes an integrator which produces a voltage continuously proportional to the instantaneous time integral of the negative loop of the input impulse. This integrated wave appears between a pair of integrated wave terminals which are connected to the second control electrode of the current-controlling device. The constants of the integrator are so chosen or so adjusted that for a control impulse of predetermined time duration and amplitude the integrated wave will become sufficient in amplitude just before the instant of zero cross-over of the original wave to raise the potential of the second control electrode of the current-controlling device to the value preparing it for the passage of current when the potential of the first control electrode reaches the requisite value. Accordingly for the desired input impulses the current-controlling device becomes conducting in response to the sharp peaks produced at the differentiated wave terminals and transmits an impulse of like sharpness to the control terminals of the switching unit.

A better understanding of the invention will be afforded by the following detailed description considered in connection with the accompanying drawings, and those features of the invention which are believed to be novel and patentable will be pointed out in the claims appended hereto.

General description

In the drawings Fig. 1 is an electrical circuit diagram schematically representing one embodiment of my invention, and Fig. 2 is a set of graphs illustrating the principle of operation of the apparatus.

In the drawings I have shown an impulse transmitting circuit or system utilized in conjunction with a switching unit 11 for controlling the application of high speed counting impulses from a cycle generator 12 to a cycle counter 13. The present application does not relate to the elements 11, 12 and 13, and these are represented schematically by rectangles. The cycle generator 12 may be any source of impulses of adequate frequency and constancy. The cycle counter 13 may be any cycle counting apparatus adapted to the counting of impulses of the frequency produced by the cycle generator 12 and may take the form, for example, of the devices disclosed in my copending applications, Serial No. 400,075, filed June 27, 1941, and Serial No. 388,820, filed April 11, 1941. The switching unit 11 may be any device which may be actuated in response to control impulses so as to be turned "on" and "off," or become conducting and non-conducting in response to successive control impulses so as to pass counting impulses from the cycle generator 12 to the cycle counter 13 during the interval between two successive control impulses. The switching unit may take the form, for example, shown in my parent application, Serial No. 419,035, filed November 13, 1941. If the frequency of the cycle generator 12 is accurately known, the cycle counter 13 may be employed for measuring the time interval between two successive control impulses applied between the control terminals 14 and 15 of the switching unit 11.

The control impulse terminals 14 and 15 are the final output terminals of the impulse transmitting arrangement described in the present application. For receiving control impulses from a source (not shown) a pair of insulated conductors 16 is provided which may be connected directly or coupled indirectly to a pair of input terminals 17 and 18. Preferably, for permitting adjustment of the minimum voltage of control impulses which are to be passed by the impulse transmitting circuit, an adjustable gain control 19, in the form of a potentiometer, is interposed between the input lines of conductors 16 and the input terminals 17 and 18. The mid point 20 of the potentiometer resistance is grounded.

For amplifying the desired impulses or control signals appearing across the input terminals 17 and 18 and substantially eliminating line to ground noise, a special amplifying circuit 21 is provided. The amplifier 21 has output or load terminals 22 and 20 (the latter being the common ground) which represent intermediate terminals of the impulse transmitting apparatus of the present application. Sets of terminals are shown in various parts of the apparatus for convenience in describing the operation and are referred to as intermediate terminals; but it will be understood that such terminals need not necessarily be brought out in the actual apparatus except for the purpose of checking the operation thereof by means of a suitable voltmeter, oscilloscope, or the like.

For converting the amplified input impulse at the terminals 22 and 20 into a sharp peak occurring precisely at the zero cross-over point of the input wave, a circuit is provided including a clipper 23 and a differentiator 24. The clipper 23 is connected across the intermediate terminals 22 and 20, either directly or indirectly. In the arrangement shown an amplifier 25 is interposed. The differentiator 24 is interposed between the clipper 23 and a pair of terminals 26 and 27 referred to as differentiated wave terminals, the terminal 27 being shown as grounded. Consequently, in the arrangement shown the terminal 27 is electrically connected to the grounded point 20 of the input potentiometer 19, which serves also as one of the output terminals of the amplifier 21. Preferably an amplifier 28 is interposed between the clipper 23 and the differentiator 24 and an amplifier 29 is interposed also between the differentiator and the differentiated wave terminals 26 and 27.

An integrator 30 is interposed between the intermediate terminals 22 and 20 and a pair of integrated wave terminals 31 and 27, the latter being shown as grounded and therefore common to the second differentiated wave terminal. Preferably the amplifier 25 is interposed between the integrator 30 and the terminals 22 and 20 and another amplifier 32 is interposed between the integrator 30 and the integrated wave terminals 31 and 27.

For controlling the application of an actuating voltage of the shape appearing between the differentiated wave terminals 26 and 27 to the final output terminals 14 and 15 serving as control terminals for the switching unit 11, a current-controlling device 33, arranged as a noise rejector, is provided. The current-controlling device 33 is so constructed that it passes the differentiated wave appearing between the terminals 26 and 27 only when the voltage between the integrated wave terminals 31 and 27 exceeds a predetermined value. If desired, an amplifier 34 may be interposed between the current-controlling device 33 and the final output terminals 14 and 15.

Noise limiting amplifier 21

The amplifier 21 comprises two stages of push-pull connected electric-discharge devices which may be of the three element vacuum tube or triode type. The first stage comprises a pair of triodes 35 and 36 and the second stage comprises a pair of triodes 37 and 38. Each triode has an anode, a cathode and a control electrode, designated by the customary symbols. The cathodes of the triodes 35 and 36 are grounded through a cathode impedance 39 and the control electrodes of the triodes 35 and 36 are coupled to the input terminals 17 and 18 in such a manner that the control electrodes have opposite polarities. For example, the control electrodes may be connected to the ends of a resistor 40, an intermediate point 40' of which is connected to an intermediate point of the cathode impedance 39, and coupling condensers 41 and 42 may be interposed between the input terminals 17 and 18 and the ends of the resistor 40. If line to ground noises of all frequencies are to be attenuated, the cathode impedance 39 may take the form of a resistor. For increasing the attenuation at higher frequencies the impedance 39 may be made inductive, and for relatively increasing the attenuation at lower frequencies the impedance 39 may be made capacitive in character. The triodes 35 and 36 are energized from a terminal 43 through a pair of anode resistors 44 and 45.

The triodes 37 and 38 are connected in a manner somewhat similar to the triodes 35 and 36 having their control electrodes coupled to the anodes of the triodes 35 and 36 and being energized from the terminal 43 through a pair of anode resistors. One of the anodes, for example, the anode of the triode 37 is connected to the terminal 22 which serves as one of the intermediate terminals of the impulse transmitting apparatus. The stage 37—38 of the amplifier 21 produces further signal amplification and line-to-ground noise attenuation.

In order to obtain faithful amplification of very weak signals applied to the terminals 17, 18, the terminal 43 is preferably connected to a suitable source of closely voltage-regulated direct current consisting of a unidirectional current source 47, a ballast resistor 48 and a filter choke 49 connected in series to the terminal 43 and with a filter condenser 50 connected between the terminal 43 and the ground terminal. For voltage regulation a pair of voltage regulator tubes such as neon tubes may be connected between the ground terminal and the common terminal 53 of the resistor 48 and the choke 49. A resistor 54 may be connected across one of the tubes, e. g., the tube 52, in order to insure that the other tube, viz: 51, will break down first when voltage is first applied from the source 47. Consequently, the voltage of the source 47 need not exceed that sufficient to break down one of the tubes 51 and 52, which have a considerably lower operating voltage at which they hold the output voltage. It will be understood that the resistor 54 is not a voltage dividing potentiometer of negligible conductance but a current-carrying element which is capable of causing the tube 51 to break down.

The amplifier 25

The amplifier 25 may take the form of a conventional electric discharge device, being shown as a tetrode screen-grid vacuum tube with a bias resistor 55 connected in its cathode lead and a by-pass condenser 56 connected across the resistor 55. The tetrode 25 has a control electrode 57 resistance-capacity coupled to the output terminal 22 of the amplifier 25 and has a screen grid 58 maintained at a suitable potential in a conventional manner with conventional by-pass condensers connected thereto. The ground terminal and a terminal 59 connected to the anode of the amplifier tube 25 serve as a second pair of intermediate terminals for the impulse transmitting apparatus. The amplifier 25 may be energized by a common anode voltage source 46, but preferably has a filter circuit 25' interposed between its anode resistor and the positive terminal B+ of the source 46.

Clipper 23

The clipper 23, as shown, takes the form of a pair of rectifying elements 60 and 61 having anodes 62 and 63, and cathodes 64 and 65 respectively. The rectifying elements 60 and 61 may be vacuum tube diode rectifiers such as type 6H6, for example. The diodes have electrodes of opposite polarity in effect connected together. That is, the anode 62 of one diode and the cathode 65 of the other diode are connected to an intermediate terminal 66 and the remaining two electrodes 63 and 64 are grounded or connected to another terminal through biases of opposite polarity. Use of an independent bias source gives least erratic action. However, one of the existing biases may be employed. In the arrangement shown the bias voltage source consists of a biasing cathode resistor 67 connected in the cathode lead of the amplifier 28. The resistor 67 has a terminal 68 at a datum potential representing the average potential of the electrodes 63 and 64 of the clipper 23, has a terminal 69 of higher potential than the terminal 68 and a second terminal 70 at a lower potential than the terminal 68. The diode cathode 64 is connected to the terminal 69 and the diode anode 63 is connected to the terminal 70 which in the arrangement illustrated is at ground potential. The by-pass condensers 71 and 72 are connected to the resistor 67 as shown.

The clipper 23 is coupled to the terminal 59 of the amplifier 25 through a resistance-capacity circuit including a condenser 73, a resistor 74 between one plate of the condenser and the clipper terminal 66, and a resistor 75 connected between the condenser 73 and the clipper terminal 68, the second plate of the condenser 73 being connected to the terminal 59 of the amplifier 25. The potential differences between the terminals 69 and 68 and between the terminals 68 and 70 are so chosen that the maximum voltages between the terminals 68 and 66 will be considerably less than the maximum deviations from the average voltage of the terminal 59, so that a square topped relatively steep-sided wave will be produced between the terminals 68 and 66, which has a narrow sloping portion in relation to the time period of the wave.

The amplifier 28 may be an amplifier of conventional type comprising an electric discharge tube represented as a screen grid vacuum tube or tetrode with a cathode 77 connected to the bias resistor 67, a control electrode 78 connected to the clipper terminal 66, a screen grid 79 connected to a point at a suitable potential in a conventional manner and an anode 80 connected in series with an anode resistor 81 to the positive terminal of a source of anode potential which may be the positive terminal B+ of a common source 46. The point 68 in the cathode bias resistor 67 serves as the point of datum potential for the clipper 23, and the amplifier control electrode 78.

Differentiator 24

The differentiator 24 comprises a resistor 82 of relatively small resistance connected in series with a condenser 83 of relatively small capacity between a ground terminal 86 and the anode terminal 80 of the amplifier 28 serving as another pair of intermediate terminals of the impulse transmitting circuit. If desired another relatively low-resistance current limiting resistor 84 may be connected in series between the resistor 82 and the condenser 83 for voltage division. The common point 85 of the resistors 82 and 84 together with the ground terminal 86 serves as another pair of intermediate terminals. They may be used as a pair of differentiated wave terminals but preferably the amplifier 29 is interposed between the terminal 85 and the differentiated wave terminal 26.

The amplifier 29 may be a conventional electric discharge tube such as a triode vacuum tube. Preferably it is designed and connected so as to be zero biased and grid limited for cutting off negative peaks to avoid the necessity for accurately controlling the amplitude of the input signal and to permit sharpening the signal in successive vacuum tube stages by small-time-constant resistance-capacity couplings. A Class B tube such as one-half of a type 6N7 may be employed, e. g., which will stand having grid and cathode tied together through a resistor. The characteristics are such that the tube operates between cut-off and the effective plate-current saturation that results from the rectifying effect of the grid which tends to limit its rise in potential. As shown it has a grounded cathode, and an anode connected in series with an anode resistor 87 to a positive current source terminal, which may be the terminal B+ of the common source 46. It has a control electrode or grid 88 connected to the terminal 85 of the differentiator 24. My invention is not limited to specific constants and relationships. However, when using a plate current source 46 of 300 volts, I have obtained satisfactory operation of the tube 29 by making the capacity of the condenser 83 one hundred micromicrofarads, and the resistances of the resistors 82 and 84, one hundred thousand and fifty thousand ohms respectively, when the time duration of negative impulses applied to the differentiator between its input terminals 80 and 86 is anything from about thirty microseconds to a few hundred microseconds or more.

The amplifier 29 is resistance capacity coupled to the differentiated wave terminals 26 and 27 through a condenser 89 and a resistor 90 which have a sufficiently small time constant to preserve the steepness of the differentiated wave appearing between the terminals 85 and 86 across the differentiator resistor 82.

Integrator 30

The integrator 30 comprises fundamentally a resistance capacity circuit of relatively large time constant which in its simplest form might consist of a relatively large condenser and a relatively large resistor connected in series between the input terminals 59 and a ground terminal 91 which comprise the load terminals of the amplifier 25, the output terminals 92 and 91 of the integrator being terminals of the condenser. However, in order to provide for adjustability of the minimum effective period of signals to which the signal transmitting circuit will respond, the condenser connected between the terminals 92 and 91 is made adjustable. It takes the form, for example, of a plurality of condensers 93 each having a different capacity, grounded on one side and connected on the other side to stationary contacts adapted to cooperate with a movable contact 94 connected to the integrator output terminal 92. Also, to facilitate providing adjustability in the responsiveness of the impulse transmitting circuit, a coupling condenser 95 is interposed in a series conection of a resistor 96 of relatively large resistance connected between the terminals 59 and 92.

The output terminals 92 and 91 of the integrator 30 serve as the input terminals of the amplifier 32, which may be an electric discharge device of conventional type shown as a screen grid vacuum tube or tetrode with a control electrode connected to the output terminal 92 of the integrator 30 and with a cathode grounded in a conventional manner through a by-passed bias resistor.

The amplifier 32 has a load terminal 97 connected to its anode which is resistance-capacity coupled to the integrated wave terminals 31 and 27, the latter being a grounded terminal.

Noise rejector 33

The current-controlling device 33 is shown as taking the form of a plural grid electric discharge device such as a 6L7 pentagrid vacuum tube, for example, arranged as a mixer amplifier. The amplifier 33 has five grids customarily designated by the numbers 1 to 5 consecutively from a cathode 98 to an anode 99. The #5 grid is connected to the cathode 98 to serve as a suppressor grid in the conventional manner and the #2 and #4 grids are connected to a point of suitable intermediate potential in a conventional manner to serve as a shield for the #3 grid. The #1 and #3 grids are utilized as independent control electrodes, the #1 grid being connected to the differentiated wave terminal 26 and the #3 grid being connected to the integrated wave terminal 31. The cathode 98 is connected through a bias resistor 100 to the ground terminal 27. Suitable by-pass condensers are provided as shown. The anode 99 is connected in series with an anode resistor 101 to a positive terminal of a source of anode voltage which may be the positive terminal B+ of the common source 46. The constants of the circuit of the amplifier 33 are so chosen that it will conduct current and transmit an impulse through its load terminal 102 connected to the anode 99 only when both the potential difference between the differentiated wave terminals 26 and 27 and the potential difference between the integrated wave terminals 31 and 27 exceed predetermined values. These values are respectively a value below that which the differentiated wave between the terminals 26 and 27 is expected to attain in response to a desired signal impulse, and a value less than the maximum amplitude of the integrated wave produced between the terminals 31 and 27 by a signal impulse having the minimum effective period for impulses which are to be transmitted through the apparatus. In this manner the device 33 serves as a noise rejector. The device 33 may be regarded as a coupling device controlled by the integrated wave at the terminals 31 and 27 for selectively coupling the differentiated wave terminals 26 and 27 to the load terminals 102 and 27.

For "zero" and "infinity" end points of the range of minimum effective periods of input signals to be passed, the movable contact 94 may have mechanically connected thereto a second movable contact 103 cooperating with a plurality of stationary contacts all of which are grounded except the last, which is designated by the numeral 104 and is connected to the cathode 98 of the amplifier 33. The movable contact 103 is connected to the integrated wave terminal 31 in series with a resistor 105.

The movable contacts 94 and 103, together with the stationary contacts form a selector switch P for adjusting the minimum effective period of signal impulses to be passed. For the end points "infinity" and "zero" respectively of the switch for testing or checking purposes, two additional grounded stationary contacts 106A and 106B are provided which cooperate with the movable contact 94. In the "infinity" position no signals are passed and in the "zero" position all signals are passed.

The amplifier 34 may also be an electric discharge device of conventional type, being shown as a triode vacuum tube with a grounded cathode and a control electrode, resistance-capacity coupled to the load terminal 102 of the amplifier 33. In order to preserve the sharp character of the impulse signal transmitted through the amplifier 33, this coupling circuit is designed with a relatively low time constant comprising a relatively small condenser 107 and a relatively low-resistance resistor 108 in series, with an additional relatively small resistor 109 interposed in series, if desired, for dividing the potential applied to the control electrode of the amplifier 34. If desired the amplifiers 34 and 29 may form two parts of a double triode vacuum tube as shown. Preferably the amplifier 34 also has zero grid bias, and the circuit constants are such that the input signal swings the grid or control electrode well beyond cutoff to produce a sharp pulse of positive polarity and having an amplitude and width essentially independent of the slope of the original signal at zero crossover.

The amplifier 34 has its anode connected in series with an anode resistor to a positive terminal from a source of anode potential in any conventional manner and the anode is connected to a load terminal 110 which is resistance-capacity coupled in any conventional manner to the final output terminals 14 and 15 which serve as the control terminalss of the switching unit 11.

*Operation in general*

The purpose to be accomplished by the impulse transmitting arrangement shown in Fig. 1 and the principle of operation will be understood more readily from the graphs of functional wave forms shown in Fig. 2. Each of the graphs of Fig. 2 represents a voltage wave and the waves are designated by the symbols $E_{10}$ to $E_{19}$, inclusive, which symbols are also applied to the points in the diagram of Fig. 1 at which voltages of such wave form appear. The apparatus for producing the input signals which are intended for actuating the control terminals 14 and 15 of the switching unit 11 is not a part of the present invention and, therefore, need not be described. It will be assumed that an input signal of the wave form shown in $E_{10}$ is received through the conductors 16 and applied to the input terminals 17 and 18. The potentiometer 19 is set at a value for controlling the minimum amplitude E of input control signals to which the apparatus is to be made responsive.

Referring to Fig. 2 it will be seen that the curve $E_{10}$ includes a voltage fluctuation 111 comprising one cycle which serves as an initiating signal, and a second single-cycle voltage fluctuation 112 which serves as a terminating signal. These two signals are for first turning the switching unit on and then turning it off. If desired the switching unit 11 may be of the type described in my aforesaid copending application Serial No. 419,035, filed November 13, 1941, which is prevented from responding to more than two signal cycles unless reset. Referring to curve $E_{10}$ again, it will be observed that there may be some ragged voltage fluctuations 113 which are irregular in wave form and occur before or after the initiating signal 111 and which might cause false operation of the switching unit 11 if the switching unit 11 were permitted to respond to such spurious voltage fluctuations 113. Owing to the fact that such spurious voltage fluctuations are usually of ragged character and would produce a disagreeable sound which if the signal output were converted into acoustic vibrations, they are frequently referred to as noise.

*Signal sharpening*

The problem of making the switching unit 11 respond precisely at the instant when the initiating signals 111 and 112 cross the horizontal axis or zero point will first be considered. In order to steepen the portion of the wave in the vicinity of the zero cross-over point, it may first be considerably amplified as represented schematically by the curve $E_{11}$. If desired the amplification may be even greater than that shown by the scale of the curves since the peaks are to be eliminated. The function of the clipper 23 is illustrated by the curve $E_{12}$. It will be apparent that a greatly magnified wave such as $E_{11}$ although originally somewhat resembling a sinusoidal wave form will become a square topped wave with a very nearly perpendicular cross-over portion 114 as shown in curve $E_{12}$, if the amplitude is limited to a fixed value relatively small in comparison with the original peak amplitude. The transmission of such a wave through a low time constant circuit such as the differentiator 24 results in the production of steep voltage impulses at the vertical portions of the curve $E_{12}$ as shown in curve $E_{31}$. After such a wave is transmitted through the amplifier 29 it is further amplified, the negative peaks are cut off, and only the amplified positive peak $E_{14}$ remains. It will be understood that in resistance-capacity coupled vacuum tube circuits having anode resistors or impedances the wave is ordinarily inverted by each stage, i. e. has the polarity reversed because anode voltage rises when grid or control electrode voltage falls, and vice versa. However, the connections and characteristics of the tube 29 are such that positive voltages applied to the control grid 88 have relatively little effect. Since the tube employed is of the type uninjured by positive grid voltages, the grid may be connected to the cathode through a resistor to give a zero bias. The tube is in effect saturated at zero grid potential because the grid rectifies the input signal without forcing the anode potential to change appreciably. The resistor 84 limits the grid current. Consequently, no appreciable change in anode-cathode discharge current is produced by the positive loops of the differentiated wave between the terminals 86—85. In this manner the negative loops in the output wave at the tube anode are cut off. The negative loops of the differentiated wave between the terminals 86 and 85, however, drive the grid negative and the anode positive. The constants are so chosen that the grid 88 is driven well beyond cutoff so that the anode is driven sharply positive. The small time constant of the resistance capacity coupling circuit 89—90, further sharpens the wave and results in a sharp positive peak between the differentiated wave terminals 26 and 27, there being but a single peak owing to the action of the tube 29 in cutting off the negative peaks. It is therefore unnecessary to have sufficient time constant in the coupling 89—90 to reproduce the wave without overshoot, which would be necessary if the two positive peaks (negative in the output) of the wave applied to the control grid 88 had been retained. Successive further sharpening of the wave in the stages 33 and 34 is thus possible by use of low-time constant coupling circuits. Comparing the peaks of curves $E_{10}$ and $E_{14}$ it will be observed that a very steep sharp peak of high amplitude and exceedingly short duration is produced at the instant that the signal 111 or 114 cross the zero point. Consequently, the instant of actuation of the switching unit 11 is precisely fixed.

*Noise rejection*

It will be evident that the various amplifications involved in the operation of sharpening the initiating signal unit 11 will also have the effect of amplifying the noise voltage fluctuations 113. Accordingly, in order to guard against spurious operation of the switching unit 11, means are provided for preventing the current-controlling device 33 from passing a signal in response to steep voltage fluctuations such as those shown at 113. For this purpose wave forms such as shown in curve $E_{15}$ are derived from signals 111 and 112 for energizing the control electrode or #3 grid of the amplifier 33 during a period within which the sharp signal impulse of $E_{14}$ is to act. The voltage of the curve $E_{15}$ is the negative integral with respect to time of the voltage of the signals 111 and 112. The first half of a loop of the curve $E_{15}$ between the points 115 and 116 is the integral of the negative loop 117 of the initiating signal 111. Geometrically it represents the area of the loop 117. The instantaneous value of the vertical distance from the horizontal axis to a point on the curve $E_{15}$ represents the time integral at that instant of the initiating signal 111. The constants of the mixer or multi-grid current-controlling device 33 are so chosen that the mixer passes the sharp impulse $E_{14}$ only when the time integral of the negative lobe of the input signal voltage approaches the value $$\frac{E \times P}{\pi}$$

where E is the minimum amplitude of an input signal which is to be accepted by the circuit and P is the minimum effective time duration of an input signal which is to be accepted by the apparatus. The value of E may be adjusted by the potentiometer 19 and the value P may be adjusted by the condenser selector switch P.

Adjustability of the degree of acceptance of the circuit is desirable for the reason that the switching unit 11 is intended to be used for response to control impulses under widely different conditions of operation. For example, when the switching unit is used under conditions when the initiating signal and the terminating signal will each be of short duration and one closely following the other, it is necessary to adjust the apparatus for acceptance of input signals of shorter time duration than when the initiating signal and the terminating signal are separated by long time intervals. In this manner the apparatus may be so adjusted as not to respond to any noise impulses occurring before or between the two successive loops of the curve $E_{15}$. It will be understood that adjusting the selector switch P for acceptance of impulses of shorter time duration has the effect of decreasing the width, measured in the horizontal direction, of the lobe of the curve $E_{15}$, so that the desired sharp impulse of curve $E_{14}$ may be passed; but any noise fluctuations shortly before or after the desired impulse will have no effect.

It will be seen accordingly that after the voltage of the wave form shown in curve $E_{14}$ has been transmitted through the current-controlling device 33, it will take the wave form shown in curve $E_{16}$ from which the noise fluctuations have been eliminated. Owing to the difficulty of accurately portraying the minute deviations in noise voltage to the scale used in Fig. 1, no attempt has been made to show the instant-to-instant variations accurately in the successive transformations of the curve 113 in the graphs E—10 to E—15 and these curves are to be considered merely as roughly indicative of the general nature of the noise. It will be understood that the switching unit 11 is so designed that a sharp impulse 111' representing an initiating signal raises a control potential therein and a sharp impulse 112' representing the terminating signal lowers the control potential therein as represented by the curve $E_{17}$. The counting impulses produced by the cycle generator 12 are represented schematically by the curve $E_{18}$ (shown with less than usual frequency for clarity), and the counter impulses transmitted by the switching unit 11 from the generator 12 to the cycle counter 13 are represented by the curve $E_{19}$. It will be observed that during the time interval between the peaks 111' and 112' the counter impulses of the curve $E_{19}$ are supplied to the cycle counter 13. An indication of the number of such cycles produced by the counter 13 serves therefore as an indication of the time interval between the initiating signal and the terminating signal.

*Circuit testing*

For testing the noise pick-up of the line 16 and checking the operation of the apparatus the end points 106A and 106B of the selector switch P may be used. When the contacts 94 and 106A are together, the integrator output terminal 92 remains grounded, the integrated wave between the terminals 31 and 27 remains zero, and the tube 33 has its #3 grid permanently biased off so that no signals can pass. This corresponds to infinite condenser capacity in the selector P or "acceptance" only of signals having an infinite time duration. On the other hand, when the contacts 94 and 106B are together, and likewise the contacts 103 and 104, the tube 32 remains biased off, but the potential of the #3 control electrode of the tube 33 is raised to cathode potential by connection thereto through the resistor 105, and any signal on the #1 grid is passed. This corresponds to acceptance of input signals of the "zero" minimum effective period. This setting of the selector switch P may be used with a noise-free line to avoid change of setting for input signals of different minimum effective periods.

In order to test the accuracy of the impulse transmitting apparatus and also the elements 12, 11 and 13, a test signal source may be provided. As illustrated in Fig. 1 I provide a double-pole double-throw switch 117 with a pair of movable blades connected to the line 16 leading to the impulse transmission system input terminals 17 and 18. The switch 117 has a pair of stationary contacts 119 connected to conductors 120 such a telephone line, e. g., leading from a regular source of control impulses (not shown), and a second pair of stationary contacts 121 connected to a test signal source.

The test signal source comprises a pick-up coil 122 which is a current-conducting coil connected to the switch contacts 121 and which is mounted near the periphery of a rotatable disk 123. For producing a magnetic flux to react inductively on the pick-up coil 122, a permanent magnet 124 is radially mounted at the edge of the disk 123. For driving the disk 123 at a uniform speed which may be held with great constancy, it is connected to a synchronous motor 125 energized by an accurately constant frequency source of alternating current 126. For checking the speed of the synchronous motor 125 a suitable device, such as a revolution counter and accurate clock, a tachometer or an accurate frequency meter 127 is provided.

When it is desired to test the operation of the control impulse transmitting and cycle counting apparatus the switch 117 is closed in a test signal position and the time interval between two successive transits of the magnet 124 past the pick-up coil 122 is determined by calculation from the speed of the synchronous motor 125 indicated by the frequency meter 127. The proper functioning of the apparatus may be checked with the motor 125 running by connecting a cathode ray oscilloscope between ground and the various intermediate terminals in succession such as the terminals 22, 59, 66, 80, 85, 26, 92, 31, and 110, for observing the wave forms.

*Line noise attenuation*

The manner in which the amplifier 21 eliminates line to ground noise from the conductors 120 and 116 will be understood from a consideration of the operation of the degenerative cathode resistors, such as the resistor 39 associated with the tubes 35 and 36. A genuine input signal produces a potential difference between the conductors 16 and likewise between the control electrodes of the tubes 35 and 36. Accordingly the discharge current of one tube is increased and that of the other tube is decreased and an amplifying effect takes place in a conventional manner by reason of the fact that the increase in current in one anode resistor 44 and a decrease in the other resistor 45, or vice versa, produces a potential difference between the two anodes which is considerably greater than the difference between the two electrodes. Since one control electrode is raised in potential as much as the other is lowered and likewise the anode current of one tube is raised as much as that of the other is lowered, there is no change in the current flowing in the degenerative cathode resistor 39. Consequently, the amplifying ratio of the tubes is unchanged and the input signal is fully amplified. However, if line to ground noise were to be picked up by the conductors 120 or 116, both control electrodes of the tubes 35 and 36 would be raised or lowered together and the current flowing in the degenerative cathode resistor 39 would be varied causing a variation in the cathode potential nearly equaling the variation in control electrode voltage in each tube. Consequently the residual grid-cathode voltage, greatly reduced, produces very little output or load voltage. In this manner, line to ground noise is attenuated, whereas the desired input signals appearing between the conductors 16 are amplified. This action is further enhanced by the second stage of tubes 37 and 38. The connections of the tubes 35 and 36, 37 and 38 also have the effect of balancing the signal voltages applied to the conductors 16 in case they should be unsymmetrical with respect to ground. In this case the lack of symmetry causes sufficient variation in current flowing in the cathode resistor 39 to balance the signal voltages with respect to the bias point 40' in the control electrodes of the tubes 35 and 36.

I have herein shown and particularly described certain embodiments of my invention and certain methods of operation embraced therein for the purpose of explaining its practice and showing its application, but it will be obvious to those skilled in the art that many modifications and variations are possible and I aim therefore to cover all such modifications and variations as fall within the scope of my invention which are defined in the appended claims.

What I claim as new and desire to secure by Letters Patent of the United States is:

1. Apparatus for producing a sharp signal impulse in response to a cycle of voltage fluctuation comprising a pair of input terminals adapted to have voltage fluctuations applied thereto, a device connected to said terminals for amplifying the voltage to steepen the portion of the voltage cycle at the zero cross-over point, said device having two output connections, a pair of diode rectifiers connected in parallel with unlike electrodes together between the output connections of the amplifying device, and a pair of output terminals for the apparatus, one of the diodes being biased positively with respect to a datum potential, the other being biased negatively with respect to a datum potential whereby the voltage wave applied thereto is clipped at the positive and negative values corresponding to said biases, said diode rectifiers being coupled to said output terminals by a resistance capacity circuit having a relatively small product of resistance and capacity, said coupling circuit including a resistance connected between the output terminals and a condenser connected between one of the output terminals and one of the output connections of the amplifying device, the second output terminal of the apparatus being connected to the second output connection of the amplifying device.

2. A discriminator for preventing the response of an impulse responsive circuit to spurious voltage variations referred to as noise, said apparatus comprising a pair of input terminals to which a voltage is adapted to be applied which is intended to fluctuate through one cycle to represent each genuine input impulse, a second pair of terminals referred to as differentiated wave terminals, apparatus interposed between the first and second pairs of terminals for converting the input cycle of voltage fluctuation into a sharp voltage impulse, a third pair of terminals referred to as integrated wave terminals, a resistance capacity coupling circuit interposed between said input terminals and said integrating terminals, said coupling circuit having a relatively high product of resistance and capacity, including a condenser connected between the integrated wave terminals and a resistor connected between one of said integrated wave terminals and one of the input terminals, the remaining input terminals, the remaining integrated wave terminal and one of the differentiated wave terminals being connected together electrically, a fourth pair of terminals referred to as output terminals, and a coupling device and mixer interposed between the differentiated wave terminals and the output terminals on the one hand and between the integrated wave terminals and the output terminals on the other hand, said coupling device having the characteristic of passing an impulse only when the voltages applied thereto exceed predetermined values, whereby the reception of a genuine signal prepares the coupling device for the passing of the sharpened genuine wave appearing at the differentiated wave terminals by applying an integration of the genuine wave to the integrated wave terminals but spurious voltage fluctuations are of insufficient time duration per cycle to produce an integrated wave of sufficient value to prepare the coupling device for impulse transmission.

3. A discriminating impulse transmitter comprising a pair of input terminals to which a voltage fluctuation is adapted to be applied as an input impulse, a second pair of terminals referred to as differentiated wave terminals, apparatus interposed between the first and second pairs of terminals for converting the input cycle of voltage fluctuation into a sharp voltage impulse, a third pair of terminals referred to as integrated wave terminals, a fourth pair of terminals referred to as output terminals and a coupling device interposed between the differentiated wave terminals and the output terminals on the one hand and between the integrated wave terminals and the output terminals on the other hand, said coupling device having the characteristic of passing an impulse only when the voltages applied thereto exceed predetermined values.

4. A discriminating impulse transmitter comprising a pair of input terminals to which a voltage fluctuation is adapted to be applied as an input impulse, a second pair of terminals referred to as integrated wave terminals, an integrating device interposed between the input terminals and the integrated wave terminals for producing a wave having an amplitude continuously proportional to the integrated value of a wave applied to the input terminals, a third pair of terminals referred to as output terminals, and a coupling device interposed between the said input terminals and the output terminals separately from said integrated wave terminals and said integrating device, said coupling device having, however, a voltage responsive control element for rendering the coupling device effective or ineffective, said voltage responsive element being connected to said integrated wave terminals for rendering the coupling device effective only when the potential difference between the integrated wave terminals equals the integrated value of waves of a minimum effective period which are to be transmitted by the coupling device.

5. A discriminating impulse transmitter comprising a pair of input terminals to which a voltage fluctuation is adapted to be applied as an input impulse, a second pair of terminals referred to as differentiated wave terminals, a clipper for converting the input wave into a square topped wave with a relatively steep cross-over portion, a device interposed between the clipper and the differentiated wave terminals for generating a steep voltage impulse at the differentiated wave terminals in response to the cross-over portion of the clipped wave, a third pair of terminals referred to as integrated wave terminals, a device interposed between the input terminals and the integrated wave terminals for producing a wave having an amplitude continuously proportional to the integrated value of a wave applied to the input terminals, and a mixer having a pair of control electrodes one of which is connected to the differentiated wave terminals and the other of which is connected to the integrated wave terminals whereby the sharp impulse at the differentiated wave terminals is passed through the mixer only when the amplitude of the integrated wave exceeds a predetermined value so that a noise voltage and other spurious voltage variations of improper time duration fail to prepare the mixer for passage of an impulse, whereby such noise voltages and spurious voltage fluctuations are cut off from the output of the mixer.

6. Apparatus for transmitting voltage fluctuations applied between a pair of conductors and substantially eliminating line to ground noise or spurious voltages picked up between said conductors and ground, said circuit comprising a pair of input terminals to which said conductors may be coupled, a pair of three-element discharge devices connected push pull, a ground terminal and an energizing source terminal between which a source of anode potential may be applied, said electric discharge devices each having an anode, a cathode and a control electrode, a coupling between said input terminals and said control electrodes for applying a potential difference between said control electrodes responsive to the potential difference between said input terminals, an impedance connected between said cathodes and said ground terminal, a pair of anode impedances each connected between said anode source terminal and one of said anodes, and an output terminal connected to one of said anodes, whereby the output voltage between said output terminal and said ground terminal fluctuates in response to variations in voltage applied between said input terminals with line to ground noise eliminated, said desired input voltage having the effect of raising the potential of one control electrode and lowering the potential of the other at any given instant to maintain substantially constant current in the cathode impedance and consequently substantially constant ratio of amplification whereby line to ground noise produces simultaneous variation in the same direction of the control electrode potentials to produce variation in current flowing in the cathode impedance whereby degenerative amplification is introduced and such line to ground voltage is attenuated.

7. A test impulse generator for an impulse responsive device comprising a rotating member carrying a permanent magnet, a current-conducting coil mounted adjacent said rotating member in inductive relation with said magnet at one angular position of the rotating member and a substantially constant speed motor for driving said rotating member with means for measuring the speed of said motor whereby the timing of electrical impulses induced in said current-conducting coil by the motion of said magnet may be compared with the measured speed of the driving motor.

8. A wave converting circuit comprising a three-element zero-biased grid-limited electric discharge device with an anode energized through an anode impedance, said device having a cathode and a control grid joined by a resistor across which a reversing polarity peaked wave is adapted to be applied, a pair of output terminals and a resistance-capacity wave-sharpening coupling between the electric discharge device and the output terminals, said coupling having a relatively small time constant, whereby the positive peaks of the wave applied to the said control electrode are relatively ineffective and the negative peak drives the discharge device abruptly beyond cutoff to transmit a sharp positive peak of increased slope to the said output terminals.

9. A wave converting circuit for producing a single steep positive peak at the zero cross-over point of a cycle of voltage fluctuation comprising a pair of input terminals to which an input voltage fluctuation cycle is adapted to be applied, an intermediate terminal, a resistor connected between the first of said input terminals and said intermediate terminal and a condenser of relatively small capacity connected between the remaining input terminal and said intermediate terminal, a grid-limited zero-biased electric discharge device having an anode, a cathode and a control grid, the resistance of said first mentioned resistor exceeding the grid to cathode resistance of said discharge device, an anode resistor adapted to be connected in series between the anode and the positive terminal of an anode voltage source having a negative terminal connected to the cathode of the discharge device, said cathode being connected to the first of said input terminals and the control electrode being connected to said intermediate terminal whereby a differentiation of the input wave applied to the input terminals appears between the first input terminal and the intermediate terminal, and the positive peaks of said differentiated wave have relatively little effect on said electric discharge device owing to its characteristic of being effectively saturated at zero grid potential by the rectifying effect of the control grid tending to limit its positive potential, but the negative peak of the differentiated wave is inverted to form a positive peak appearing at the anode of the electric discharge device, the time constant or resistance-capacity product of said differentiating resistor and condenser being small in relation to the expected time duration of negative input impulses for permitting the control grid to return to within negative cut-off potential and thus to restore the anode potential to the initial value before the end of the input impulse, thereby making the output pulse duration and shape as well as amplitude independent of input impulse shape and duration.

PHILIP C. MICHEL.